United States Patent
Kudou et al.

(10) Patent No.: US 7,906,867 B2
(45) Date of Patent: Mar. 15, 2011

(54) POWER STEERING LOCK APPARATUS

(75) Inventors: Tsuneo Kudou, Hiroshima (JP); Takashi Fujita, Hiroshima (JP); Osamu Michihira, Hiroshima (JP); Takuji Oka, Hiroshima (JP); Izumi Dohi, Hiroshima (JP); Makoto Tanaka, Hiroshima (JP)

(73) Assignee: U-Shin Ltd., Tokyo (JP)

( * ) Notice: Subject to any disclaimer, the term of this patent is extended or adjusted under 35 U.S.C. 154(b) by 124 days.

(21) Appl. No.: 12/361,793

(22) Filed: Jan. 29, 2009

(65) Prior Publication Data

US 2009/0193861 A1 Aug. 6, 2009

(30) Foreign Application Priority Data

Feb. 1, 2008 (JP) ................. 2008-023018

(51) Int. Cl.
*B60L 1/00* (2006.01)
(52) U.S. Cl. ...................... 307/9.1; 307/10.1
(58) Field of Classification Search .................. 307/9.1, 307/10.1
See application file for complete search history.

(56) References Cited

U.S. PATENT DOCUMENTS

| 6,400,041 B1 | 6/2002 | Engelmann et al. |
| 2006/0076834 A1* | 4/2006 | Kamiya ...................... 307/10.1 |

FOREIGN PATENT DOCUMENTS

JP 2001-1865 1/2001

* cited by examiner

*Primary Examiner* — Robert L. Deberadinis
(74) *Attorney, Agent, or Firm* — Wenderoth, Lind & Ponack, L.L.P.

(57) ABSTRACT

A power steering lock apparatus provides high reliability and can be actuated using minimal control parts. In a power steering lock apparatus including a lock bolt, an actuator, an actuator driving part, position detecting part, and a slave control part, and being structured such that the slave control part executes a control in accordance with a control signal output by a host control part, the host control part outputs an integrity confirmation code signal to the slave control part, the slave control part executes a computing process by using the input integrity confirmation code signal as a parameter, and outputs a result of computation as an integrity confirmation information to the host control part, and the host control part outputs an engine start signal when the host control part determines that the slave control part is normally activated, and the lock bolt indicates an unlock position state.

17 Claims, 7 Drawing Sheets

POWER STEERING LOCK APPARATUS

BACKGROUND OF THE INVENTION

The present invention relates to a power steering lock apparatus for locking a steering wheel of a vehicle or the like.

Conventionally, for the purpose of preventing theft of a vehicle, there has been provided a steering lock apparatus for locking a steering wheel of the vehicle or the like. The steering lock apparatus is structured such that an engagement concave portion is provided in an outer periphery of a steering shaft rotating in accordance with a steering operation, and a lock bolt which is movable forward and backward moves forward so as to engage with the engagement concave portion if a driver carries out a stop operation of an engine of the vehicle by a key or the like, whereby the rotation of the steering shaft is restricted and the steering wheel is locked. On the other hand, if the driver carries out a start operation of the engine by the key, the lock bolt moves backward from the engagement concave portion, and the engagement is released, whereby the rotation restriction of the steering shaft is released, and the steering wheel is unlocked.

Further, in recent years, there has been in widespread use a keyless entry system enabling opening and closing a door and starting the engine without using a structural mechanical key. Further, in this keyless entry system, if an operation of an operating unit in place of a cylinder lock to which the mechanical key is inserted is detected in a certified state of a normal electronic key, the engine is started and stopped, and simultaneously, the steering wheel is locked and unlocked by the steering lock apparatus.

One of the problems which should be avoided even in a malfunction in the power steering lock apparatus applied to the keyless entry system is the engine coming to a drive state in spite of the fact that the lock bolt is set to the lock position. This prevents an accident from being caused by driving the vehicle in spite of the fact that the steering operation can not be carried out.

Accordingly, in the conventional power steering lock apparatus, in order to absolutely ensure the fact that the lock bolt does not exist at the lock position, a microcomputer is mounted on the power steering lock apparatus. Further, the structure is made such as to further monitor the microcomputer monitoring the lock state of the lock bolt by the other microcomputer.

For example, the structure is made such that two microcomputers are mounted on the power steering lock apparatus, the microcomputers mutually monitor the lock state of the lock bolt, and an assured position information of the lock bolt is transmitted to a host microcomputer mounted on the vehicle.

Alternatively, the structure is made such as to mount one microcomputer (a slave microcomputer) on the power steering lock apparatus and connect the host microcomputer mounted on the vehicle to the power steering lock apparatus, thereby directly monitoring the position of the lock bolt by both the slave microcomputer and the host microcomputer. In Japanese Unexamined Patent Publication No. 2001-001865, a supply voltage to a circuit device (a slave control part) of the lock apparatus is turned on and off by means of a switch element of a central control unit (a host control part), and a state of the lock apparatus is monitored by a sensor provided in the lock apparatus in a state that the supply voltage of the lock apparatus is turned off.

However, in the former power steering lock apparatus, since it is necessary to mount two microcomputers, there is a problem that cost is increased. Further, in the latter power steering lock apparatus, it is necessary to wire a communication wire for connecting the host microcomputer and the slave microcomputer, and a communication wire by which the host microcomputer is directly connected to a detection switch for detecting the position of the lock bolt. This causes problems that a wiring number of the communication wires is increased, an assembling workability to the vehicle is deteriorated, and the cost is increased.

SUMMARY OF THE INVENTION

The present invention is made by taking the conventional problem into consideration, and an object of the present invention is to provide a power steering lock apparatus having a high reliability which can be actuated by minimum control part and communication wires, by improving a reliability of a lock bolt position information transmitted to a host control part from a slave control part.

In order to achieve the object mentioned above, of the present invention, there is provided a power steering lock apparatus comprising:

a lock bolt which is movable between a lock position at which the lock bolt is engaged with a steering shaft, and an unlock position at which the engagement is released;

an actuator moving the lock bolt;

an actuator driving part driving the actuator;

a position detecting part detecting an operating position of the lock bolt; and a slave control part controlling the actuator driving part;

wherein when a host control part which is mounted on a vehicle and outputs an engine start signal by detecting an operation of a switch for starting the engine outputs a control signal to the slave control part, the slave control part executes a control in accordance with the signal.

The power steering lock apparatus is so constructed that: the host control part outputs an integrity confirmation code signal to the slave control part by detecting the operation of the switch, the slave control part executes a computing process by using the input integrity confirmation code signal as a parameter, and outputs a computing result together with the lock bolt position information input from the position detecting part as an integrity confirmation information to the host control part, the host control part determines based on the input integrity confirmation information whether or not the slave control part normally operates, and outputs an engine start signal when the slave control part normally operates and the lock bolt position information by the position detecting part indicates the unlock position state.

In accordance with the power steering lock apparatus, since the structure is made such that the host control part can confirm the integrity of the slave control part, it is not necessary for the host control part to directly detect the position information of the lock bolt in spite of the fact that only one control part is mounted. Accordingly, it is possible to reduce the number of the control parts mounted on the power steering lock apparatus. Further, it is possible to reduce the number of the communication wires wiring between the host control part and the power steering lock apparatus, and it is possible to make the wiring number minimum. Further, since the host control part confirms the integrity of the slave control part, and outputs the engine start signal when the lock bolt is positioned in the unlock state, it is possible to securely prevent a serious problem from being generated.

In the power steering lock apparatus, it is preferable that the computing process of the integrity confirmation information includes a command for executing a control inputting the lock bolt position information from the position detecting part and transmitting the lock bolt position information to the host control part. In accordance with the structure mentioned above, it is possible to determine whether or not there exists an abnormality in a control obtaining the lock bolt position information.

Further, it is preferable that the slave control part has a plurality of function blocks executing a control inputting the lock bolt position information from the position detecting part and transmitting the lock bolt position information to the host control part, and executes the computing process of the integrity confirmation information by the function block. In accordance with the structure mentioned above, it is possible to determine whether or not there exists an abnormality in the function blocks executing the control.

Further, in accordance with these structures, it is possible to improve the integrity of the power steering lock apparatus. Further, since the processes which are not relevant to the control detecting the position of the lock bolt are not carried out, it is possible to shorten a computing time.

In the power steering lock apparatuses, it is preferable that the host control part transmits the integrity confirmation code signal together with an unlock demand signal transmitted to the slave control part.

Further, it is preferable that the slave control part executes the computing process of the integrity confirmation information in parallel with the process obtaining the position information of the lock bolt from the position detecting part.

In the power steering lock apparatus of the present invention, since the host control part can confirm the integrity of the slave control part, it is possible to reduce the number of the mounted control parts. Further, it is possible to reduce the number of the communication wires wired between the host control part and the power steering lock apparatus thereby realizing the minimum number of wires.

BRIEF DESCRIPTION OF THE DRAWINGS

FIGS. 2A and 2B show a lock apparatus, in which

DETAILED DESCRIPTION OF THE INVENTION

A description will be given below of an embodiment of the present invention with reference to the accompanying drawings.

Figure 1:
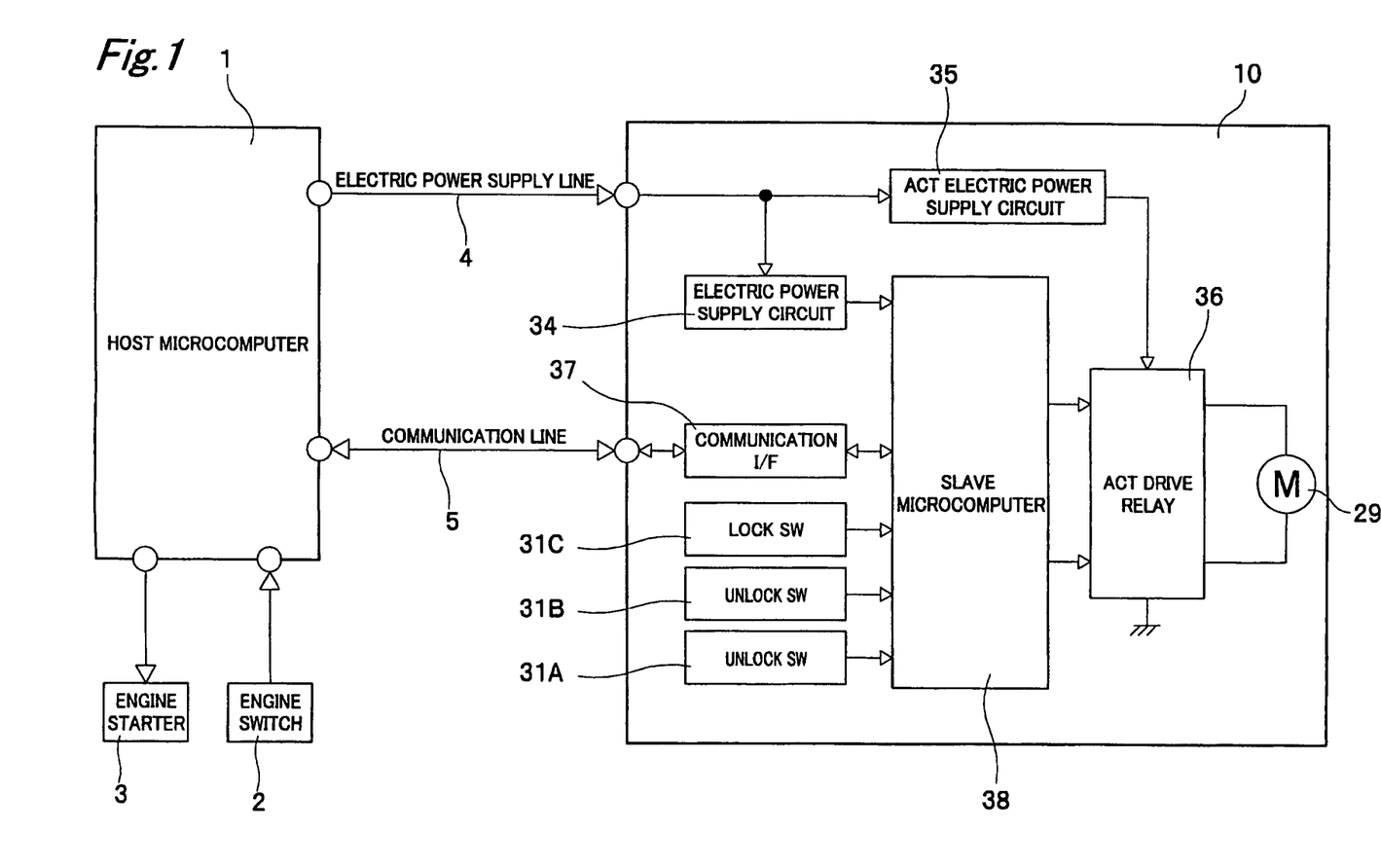
FIG. 1 is a block diagram showing a structure of a power steering lock apparatus in accordance with an embodiment of the present invention.

FIG. 1 shows a power steering lock apparatus (hereinafter, abbreviated as "lock apparatus") in accordance with an embodiment of the present invention. The lock apparatus 10 is structured such that one microcomputer (hereinafter, refer to as "slave microcomputer") 38 serving as a control part is mounted, the lock apparatus 10 being actuated by the slave microcomputer 38 in accordance with a control signal of a microcomputer (hereinafter, refer to as "host microcomputer") 1 serving as a host control part mounted on a vehicle.

First of all, the host microcomputer 1 mounted on the vehicle is connected to an engine switch 2 for starting and stopping an engine, a starter 3 for starting the engine, and a lock apparatus 10. The host microcomputer 1 is structured such as to confirm an integrity of the lock apparatus 10 by detecting an operation of the engine switch 2, and start the engine via the starter 3 when the lock apparatus 10 is in an unlock state. The host microcomputer 1 is connected to the lock apparatus 10 by two electric wires including an electric power connecting line 4 for switching a supply and an interruption of an electric power with respect to the lock apparatus 10, and a communication wire 5 for sending and receiving a control signal.

Specifically, the host microcomputer 1 in accordance with the present embodiment outputs an integrity confirmation code signal together with an unlock demand signal to the slave microcomputer 38 of the lock apparatus 10 when detecting the operation of the engine switch 2. Thereafter, the host microcomputer 1 confirms an integrity whether or not the slave microcomputer 38 is normally activated based on the integrity confirmation information returned from the slave microcomputer 38. Further, the host microcomputer 1 can confirm the integrity of the slave microcomputer 38 in a certified state of a normal electronic key, and output a signal for starting the engine to the starter 3 only when the position information of the lock bolt 13 transmitted together with the integrity confirmation information indicates the unlock position state.

Further, the host microcomputer 1 in accordance with the present embodiment is connected to the other sub host microcomputer (not shown) mounted on the vehicle via the communication wire 5. Further, the integrity is confirmed mutually by the host microcomputers. In this case, the sub host microcomputer carries out a control of receiving an ID code of an electronic key possessed by a user via an antenna mounted on the vehicle so as to compare the received ID code with a previously stored certification code, and determining whether or not the user having the normal electronic key gets in the vehicle. Further, if the host microcomputer 1 detects the starting operation of the engine switch 2, the sub host microcomputer transmits the ID code received together with the certified result based on the demand of the host microcomputer 1 to the host microcomputer 1. Further, if the host computer 1 detects an opening and closing operation of a door lock apparatus, it outputs a control signal for opening and closing to the door lock apparatus.

Next, a description will be specifically given of the lock apparatus 10. The lock apparatus 10 is arranged around a steering shaft 6 rotating in accordance with a rotating operation of a steering wheel (not shown). The lock apparatus 10 is actuated by the slave microcomputer 38 mounted on the lock apparatus 10 if the host microcomputer 1 detects the operation of the engine switch 2. In this case, engagement concave portions 7 are formed in the steering shaft 6 at a predetermined position in a peripheral direction in the same manner as the conventional one.

Figure 2A:
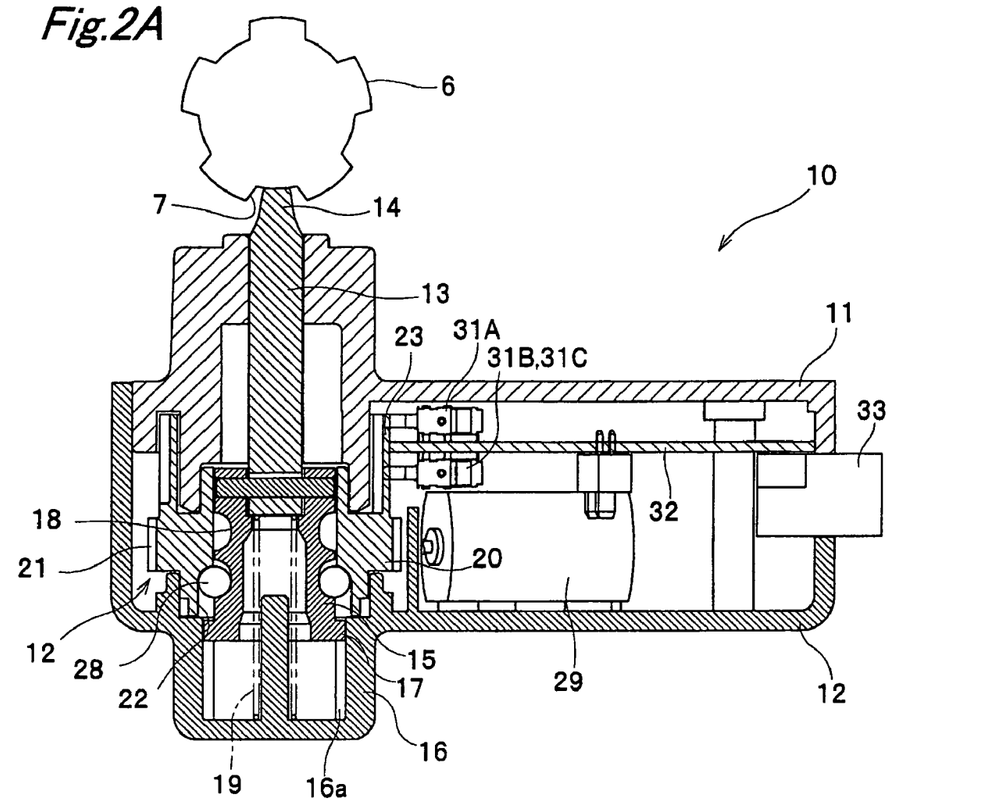
FIG. 2A is a cross sectional view and FIG. 2B is a plan view of a state that a case is detached.
Figure 2B:
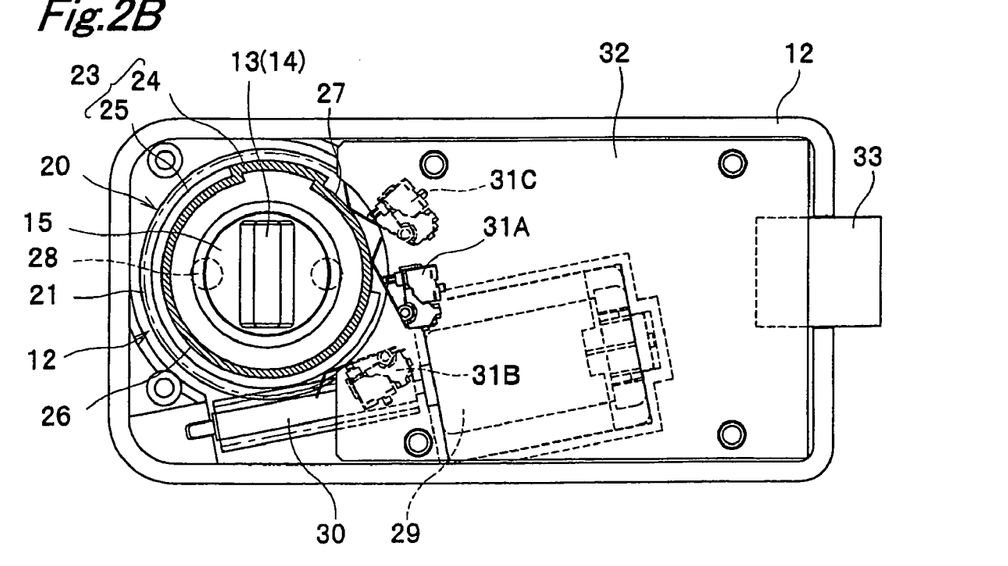

Specifically, the lock apparatus 10 includes a casing 11 having a case 11a with one end opened and a cover 11b, as shown in FIGS. 2A and 2B, and the casing 11 being fixed so as to be positioned at the engagement concave portion 7 of the steering shaft 6. Further, the casing 11 contains therein a lock bolt 13 engaging with the engagement concave portion 7 of the steering shaft 6, an actuator 12 moving the lock bolt 13, an electric motor 29 serving as an actuator driving part driving the actuator 12, and micro switches 31A to 31C serving as a position detecting part detecting an operating position of the lock bolt 13.

The lock bolt 13 is formed as a square pole shape passing through the case 11a, and includes an engagement convex portion 14 inserted and locked to the engagement concave portion 7, in an upper end thereof. The lock bolt 13 is moved in such a manner as to move forward and backward between a lock position at which the lock bolt is moved forward to the steering shaft 6 to engage with the engagement concave portion 7, and an unlock position at which the lock bolt is moved backward to release the engagement, by the actuator 12 and the electric motor 29 mentioned below. Further, in the case that the engagement convex portion 14 does not align with the engagement concave portion 7 in the peripheral direction, as the lock bolt 13 is energized by a spring 19 in a forward moving direction, if the engagement concave portion 7 of the steering shaft 6 aligns with the engagement convex portion 14 based on the rotating motion of the steering wheel, the energizing force causes the engagement convex portion 14 of the lock bolt 13 to engage with the engagement concave portion 7.

The lock bolt 13 in accordance with the present embodiment is coupled to an independent cam member 15, and is moved forward and backward via the cam member 15. The cam member 15 has an approximately cylindrical shape, and a lower portion thereof is arranged within a bulge portion 16 of the cover 11b, and an upper portion thereof is arranged in an inner portion of the rotary gear 20. A guide convex portion 17 inserted to a guide groove 16a of the evagination portion 16 is provided in a protruding manner in a lower end outer peripheral portion of the cam member 15 so as to be spaced at a predetermined interval in the peripheral direction. Further, a pair of cam grooves 18 are provided in an outer peripheral portion of the cam member 15 so as to oppose in a diametrical direction, the cam groove 18 whirling in such a manner as to form an approximately spiral shape and concaved as an approximately semicircular shape. Further, the cam member 15 is energized in a direction in which the lock bolt 13 is moved forward by the spring 19.

The actuator 12 is provided with the cam groove 18 arranged in the cam member 15, a rotary gear 20 in which the cam member 15 is disposed so as to be movable forward and backward, and a cam follower 28 arranged in the rotary gear 20 and moving the cam member 15.

The rotary gear 20 has a cylindrical shape having an accommodating space accommodating the cam member 15 in a center. The rotary gear 20 is sandwiched between the case 11a and the cover 11b and held rotatably in a peripheral direction without moving in an axial direction. An outer peripheral portion of the rotary gear 20 is provided with a worm wheel portion 21 forming a plurality of helical teeth engaging with the tooth of a worm gear 30. Further, a lower portion of an inner peripheral surface of the rotary gear 20 is provided with a pair of vertical grooves 22 extending along an axial direction from an open edge and concaved in an approximately semicircular shape in such a manner as to oppose in a diametrical direction.

Figure 3:
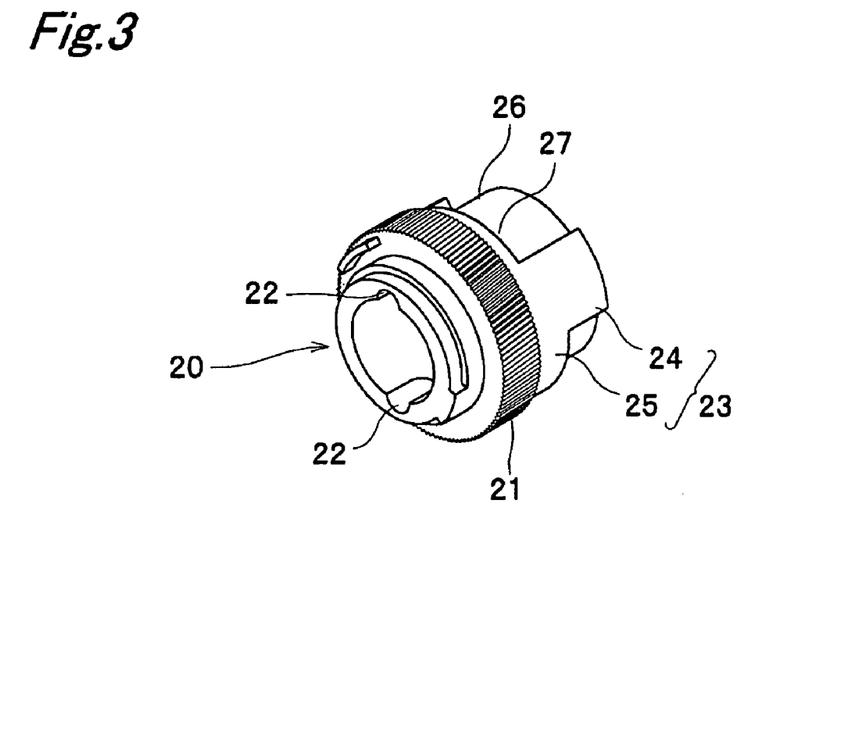
FIG. 3 is a perspective view when viewing a rotary gear from a bottom.

Further, the rotary gear 20 in accordance with the present embodiment is provided with an annular switch cam portion 23 extending upward from an outer peripheral portion. The switch cam portion 23 includes a first cam portion 24 and a second cam portion 25 at different positions which are adjacent to each other along a rotating axis of the rotary gear 20, as shown in FIG. 3, for turning on and off the micro switches 31A to 31C mentioned below. The first cam portion 24 is positioned in a leading end side which is away from the worm wheel portion 21, and is provided in such a manner as to form an approximately circular arc shape in a peripheral direction except a first concave portion 26, by forming a first concave portion 26 which is concaved inward in a diametrical direction over a previously set angle range (about 308 degree in the present embodiment). The second cam portion 25 is positioned in a side of the worm wheel portion 21, and is provided in such a manner as to form an approximately C-shaped form in the peripheral direction except a second concave portion 27 in the same manner as the first cam portion, by forming a second concave portion 27 which is concaved inward in the diametrical direction over a previously set angle range (about 68 degree in the present embodiment).

The cam follower 28 comprises a spherical steel ball, and is arranged in the vertical groove 22 of the rotary gear 20, as shown in FIG. 2. Further, if the rotary gear 20 is rotated in a state that a portion protruding from the vertical groove 22 is fitted to the cam groove 18 of the cam member 15, and then the vertical groove 22 is rotated in the peripheral direction, the cam follower 28 slides along the cam groove 18 of the cam member 15 restricted so as to be non-rotatable, and moves forward and backward the lock bolt 13 along the rotating axis of the rotary gear 20 via the cam member 15.

A specific structure of the cam groove 18 of the cam member 15 will be described.

Figure 5:
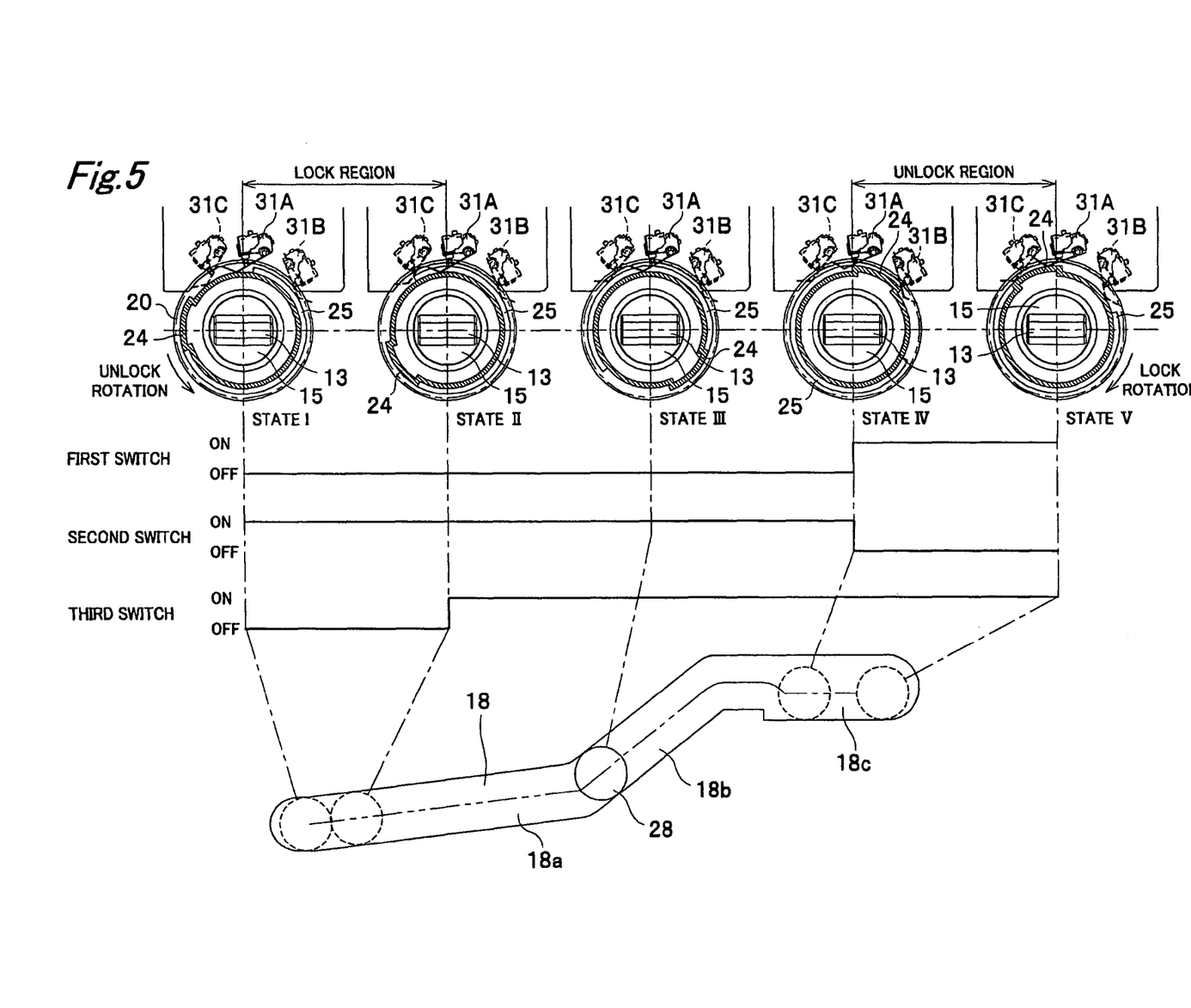
FIG. 5 is a time chart showing a relation among a cam groove of a cam member, the rotary gear and switch elements.

The cam groove 18 includes a first extension portion 18a extending upward from a lower end at a gentle angle of gradient (about 6 degree in an angle with respect to a horizontal line), a second extension portion 18b extending from an end of the first extension portion 18a at a steeper angle of gradient (about 38 degree in an angle with respect to the horizontal line) than the first extension portion 18a, and a third extension portion 18c extending in a horizontal direction from an end of the second extension portion 18b, as shown in an expansion plan view in FIG. 5. In the cam groove 18, a lower end side (a left side) constructs a lock position by the lock bolt 13, and an upper end side (a right side) constructs an unlock position by the lock bolt 13. Specifically, in a state that the cam follower 28 does not move up and down along the vertical groove 22 of the rotary gear 20, if the cam follower 28 is positioned in a lower side of the cam groove 18, the cam member 15 comes to a lock state (a position in FIG. 2A) in which the cam member 15 moves upward, and if the cam follower 28 is positioned in an upper side of the cam groove 18, the cam member 15 comes to an unlock state that the cam member 15 moves downward (depressed). A sliding position (height) of the cam follower 28 shown by a solid line within the cam groove 18 corresponds to a state that a leading end of the engagement convex portion 14 of the lock bolt 13 is positioned in an open end of the engagement concave portion 7 of the steering shaft 6, in FIG. 5.

The electric motor 29 is a driving source for moving the lock bolt 13. An output shaft of the electric motor 29 is provided with a worm 30 or a screw gear. The electric motor 29 is electrically connected to a substrate 32 mentioned below with a soldering, and can carry out a forward rotating operation moving forward the cam member 15, and a reverse rotating operation moving backward the cam member 15.

Figure 4:
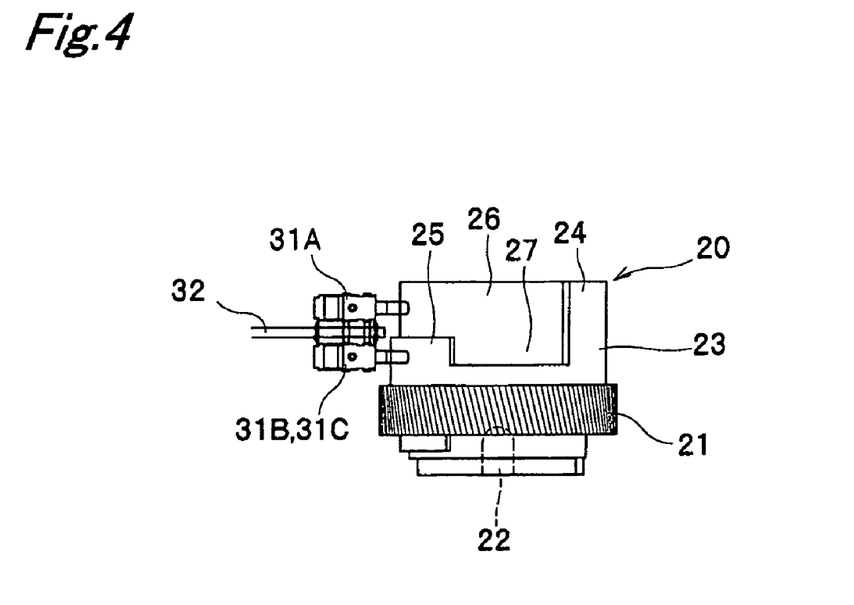
FIG. 4 is a side elevational view showing a positional relation between the rotary gear and a substrate.

The position detecting part is structured such as to detect the operating position of the lock bolt 13 via the rotary gear 20, by detecting a rotating position of the rotary gear 20, and includes a switch cam portion 23 of the rotary gear 20, and the micro switches 31A to 31C mounted on the substrate 32, as shown in FIGS. 2 and 4. The substrate 32 is assembled in the inner portions of the case 11a and the cover 11b in such a manner as to be positioned in a boundary portion between the first cam portion 24 and the second cam portion 25 corresponding to an intermediate portion of the switch cam portion 23, as illustrated.

The micro switches 31A to 31C are structured such as to be turned on by pressing a detection lever, and are of a normally open type which outputs an Hi signal in a state of being turned on by the switch cam portion 23 and outputs an Lo signal in a state of being not turned on. Further, in the present embodiment, the first micro switch 31A is arranged in a front face side positioned in an upper side in the drawing, and the second and third micro switches 31B and 31C are arranged in a rear face side positioned in a lower side. Accordingly, the first micro switch 31A is turned on and off by the first cam portion 24 of the rotary gear 20, and the second and third micro switches 31B and 31C are turned on and off by the second cam portion 25 of the rotary gear 20.

In the present embodiment, the first micro switch 31A is structured such as to detect whether or not the lock bolt 13 moves within the unlock region via the rotary gear 20 and the cam member 15. Further, the second micro switch 31B is structured such as to detect whether or not the lock bolt 13 moves within the unlock region. Further, the third micro switch 31C is structured such as to detect whether or not the lock bolt 13 moves within the lock region. In other words, the structure is made such as to detect whether or not the lock bolt moves within the unlock region by two micro switches 31A and 31B among three micro switches 31A to 31C. Taking into consideration of a safety in connection with traveling of a motor vehicle first, a state that the lock bolt 13 is positioned within the unlock region is safest and it is not said that a safety can be secured in the other regions. According to the above construction, it is possible to detect the unlock side even if any micro switch 31A or 31B gets out of order.

Next, a description will be given of the on and off motions of the micro switches 31A to 31C by the rotary gear 20 accompanied with the unlock operation and the lock operation.

As shown in a state I in FIG. 5, in the lock state that the cam follower 28 is positioned in a lower end of the cam groove 18, the first micro switch 31A is in an off state, the second micro switch 31B is in an on state, and the third micro switch 31C is in an off state.

If the unlock operation is carried out, and the electric motor 29 is forward driven so as to rotate the rotary gear 20 in a counterclockwise direction, the lock bolt 13 deviates from the lock region, and as shown in a state II, the third micro switch 31C comes to the on state, the first micro switch 31A maintains the off state, and the second micro switch 31B maintains the on state.

Thereafter, if the lock bolt 13 completely breaks away from the engagement concave portion 7 of the steering shaft 6, the first micro switch 31A maintains the off state, the second micro switch 31B maintains the on state, and the third micro switch 31C maintains the on state, respectively, as shown in a state III.

Further, if the lock bolt 13 moves backward to the unlock region, the first micro switch 31A comes to the on state, the second micro switch 31B comes to the off state, and the other third micro switch 31C maintains the on state, as shown in a state IV.

Detecting the state IV via the micro switches 31A to 31C, the slave microcomputer 38 determines that the lock bolt 13 comes to the unlock state, and stops the electric motor 29. Then, the rotary gear 20 rotates to a position shown in a state V in accordance with an inertia motion. In this state, the first micro switch 31A maintains the on state, the second micro switch 31B maintains the off state, and the third micro switch 31C maintains the on state, respectively.

On the other hand, if the electric motor 29 is reversely driven and the rotary gear 20 is rotated in the clockwise direction in the unlock state shown in the state V, the lock bolt 13 deviates from the unlock region conversely to the above, whereby the first micro switch 31A comes to the off state, the second micro switch 31B comes to the on state, and the other third micro switch 31C maintains the on state, as shown in the state W.

Thereafter, if the lock bolt 13 moves forward to the engagement concave portion 7 of the steering shaft 6, the first micro switch 31A maintains the off state, the second micro switch 31B maintains the on state, and the third micro switch 31C maintains the on state, respectively, as shown in the state III.

Further, if the lock bolt 13 moves forward to the lock region, the third micro switch 31C comes to the off state, the first micro switch 31A maintains the off state, and the second micro switch 31B maintains the on state, as shown in the state II.

Detecting this state II via the micro switches 31A to 31C, the slave microcomputer 38 determines that the lock bolt 13 comes to the lock state, and stops the electric motor 29. Accordingly, the rotary gear 20 rotates to the position shown in the state I in accordance with an inertia motion. In this state, the first micro switch 31A maintains the off state, the second micro switch 31B maintains the on state, and the third micro switch 31C maintains the off state, respectively.

The lock apparatus 10 structured as mentioned above is mechanically held at its unlock position with certainty, if the lock bolt 13 is positioned at the unlock position. Accordingly, it is an extremely low possibility that the lock bolt 13 comes out to the unlock position mechanically during the traveling. Therefore, if it is possible to securely assure a reliability that the lock bolt 13 exists in the unlock position at a time of starting the engine, it is preferable to interrupt the current supply to the lock apparatus 10 during the traveling because a possibility that a malfunction is caused can be extremely reduced.

On the other hand, as shown in FIG. 1, on the substrate 32 mounting the micro switches 31A to 31C, a connector 33, an electric power supply circuit 34, an ACT electric power supply circuit 35, a drive relay 36 and a communication interface 37 are mounted in addition to the micro switches 31A to 31C and the slave microcomputer 38 serving as the control part.

The connector 33 connects the electric power connecting line 4 and the communication wire 5 connected to the host microcomputer 1 if a mate connector (not shown) is connected. The electric power connecting line 4 switches a connecting state of a switching device such as a lead switch (not shown) based on an output of the Hi signal or the Lo signal from the host microcomputer 1 to apply or interrupt the electric power from an electric power line (not shown) connected to a battery to the lock apparatus 10.

The electric power supply circuit 34 is structured such as to convert the electric power supplied from the battery into an electric voltage by which the slave microcomputer 38 can be activated, and supply the converted electric voltage to the slave microcomputer 38.

The ACT electric power supply circuit 35 is structured such as to connect or disconnect the electric power connecting line 4 in correspondence to the control signal from the host microcomputer 1, and supply the electric power from the battery to the drive relay 36 as needed. In the present embodiment, the electric power is supplied to the drive relay 36 only at a time when the slave microcomputer 38 is fed.

The drive relay 36 is structured such as to switch a feeding direction to the electric motor 29 based on the control signal of the slave microcomputer 38, and rotate forward, rotate backward and stop the electric motor 29.

The communication interface 37 is structured such as to connect the host microcomputer 1 and the slave microcomputer 38 so as to communicate with each other.

The slave microcomputer 38 is activated in accordance with a program which is stored in an ROM 43 serving as an installed memory part. The slave microcomputer 38 is structured such that if the slave microcomputer 38 receives the control signal from the host microcomputer 1, it controls the electric motor 29 so as to forward and backward rotate in accordance with the program corresponding to the received control signal and allows the lock bolt 13 to carry out a lock actuation and an unlock actuation of the lock bolt 13.

In the present embodiment, the slave microcomputer 38 is structured such that if receiving the integrity confirmation code signal transmitted together with the unlock demand signal from the host microcomputer 1, the slave microcomputer 38 executes a computing process by using the input integrity confirmation code signal as a parameter in parallel with a detection process of the position information of the lock bolt 13 obtained by executing the unlock process, and outputs the result of computation as an integrity confirmation information together with the position information of the lock bolt 13 to the host microcomputer 1.

Figure 6:
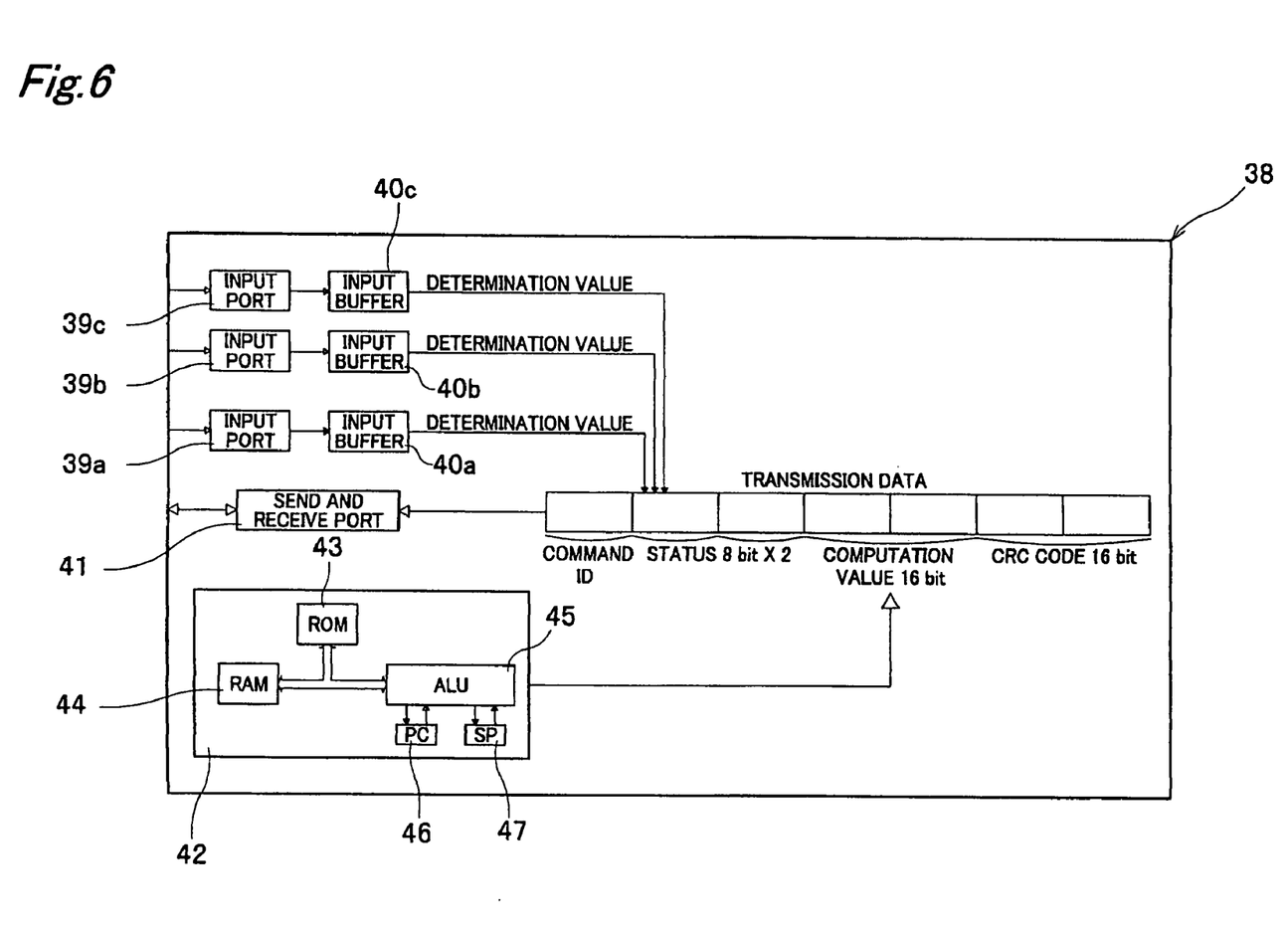
FIG. 6 is a block diagram showing a structure of a microcomputer.

Specifically, the slave microcomputer 38 includes three input ports 39a, 39b and 39c, three input buffers 40a, 40b and 40c, a transmit and receive port 41, and a function block 42, as shown in FIG. 6.

The input ports 39a, 39b and 39c output the Hi signal or the Lo signal corresponding to the on-off information input from the micro switches 31A to 31C to the corresponding input buffers 40a to 40c. Further, the input buffers 40a, 40b and 40c temporarily store the input on and off information of the micro switches 31A to 31C, and output the information as a determination value, for compensating for a difference of a processing speed or a transfer rate. Further, the transmit and receive port 41 is connected to the host microcomputer 1 via the communication interface 37 so as to be communicable with each other.

The function block 42 is a circuit portion for computing the integrity confirmation information based on the input integrity confirmation code signal, and includes a ROM 43, a RAM 44, an arithmetic and logic unit (ALU) 45, a program counter 46, a static pointer 47 and the like. The ROM 43 is a read only memory, and stores a previously set program and the like. The RAM 44 is a writable and readable memory, and temporarily stores the integrity confirmation code received from the host microcomputer 1, the computed integrity confirmation information and the like. The arithmetic and logic unit 45 computes the integrity confirmation information and the like. Specifically, the arithmetic and logic unit 45 executes, in a combination manner, a combination encompassing a mnemonic (obtained by substituting a mechanical language command with a combination of an alphameric character set and a symbol) such as a transfer, an increase and decrease, a logic operation and the like and operands (subject to be computed) such as a register, a flag register, the ROM 43, the RAM 44 and the like, and a command (call-return, branch, push/pop and the like) operating the program counter (PC) 46, and the static pointer (SP) 47, and then the arithmetic and logic unit 45 accesses the function block 42 within the slave microcomputer 38, and sets the result of computation in the register. In the structure of the function block, the structure which is at least relevant to the present embodiment is described as one example, however, it is not limited to the circuit structure mentioned above.

The integrity confirmation information computed by the slave microcomputer 38 structured as mentioned above is structured such as to include a command for executing a control inputting the position information of the lock bolt 13 from the micro switches 31A to 31C and transmitting the position information of the lock bolt 13 to the host microcomputer 1. In other words, in order to carry out the computation using the commands used in the slave microcomputer 38 as completely as possible, the integrity confirmation information is structured such as to include the command used when inputting the position information of the lock bolt 13 from the micro switches 31A to 31C and processing the position information so as to transmit it to the host microcomputer 1. The process of the input position information means applying a general process such as removing a noise caused by a chattering at a time of changing the switch to the output signal from the micro switches 31A to 31C. Further, the computation for confirming the integrity is structured such as to be executed by the function block 42 executing the driving process of the lock bolt 13. Accordingly, it is possible to confirm the integrity whether or not the process inputting the position information of the lock bolt 13 at least from the micro switches 31A to 31C and processing the position information so as to transmit it to the host microcomputer 1 is property carried out.

Figure 7:
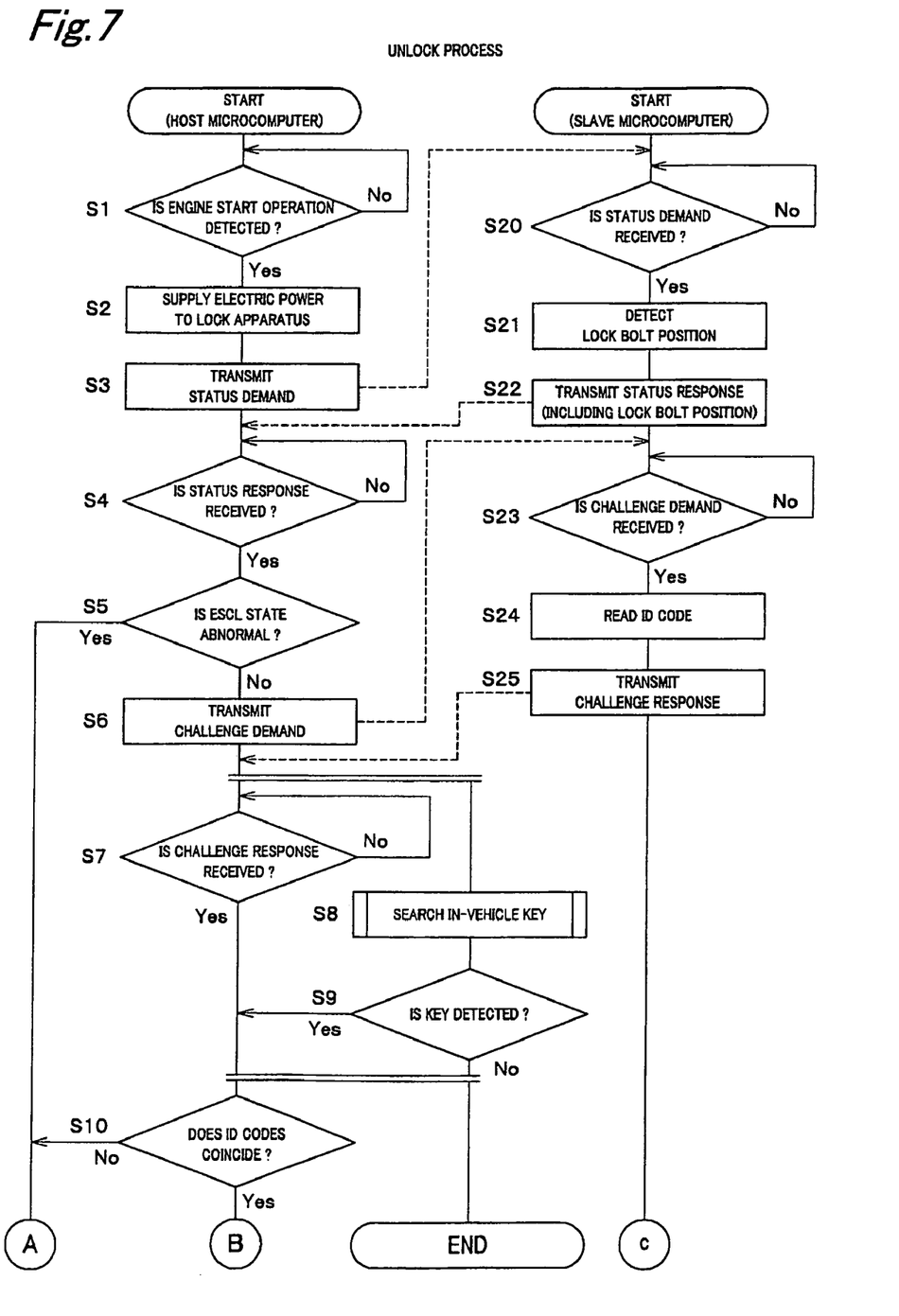
FIG. 7 is a flow chart showing a control of a host microcomputer and a slave microcomputer.
Figure 8:
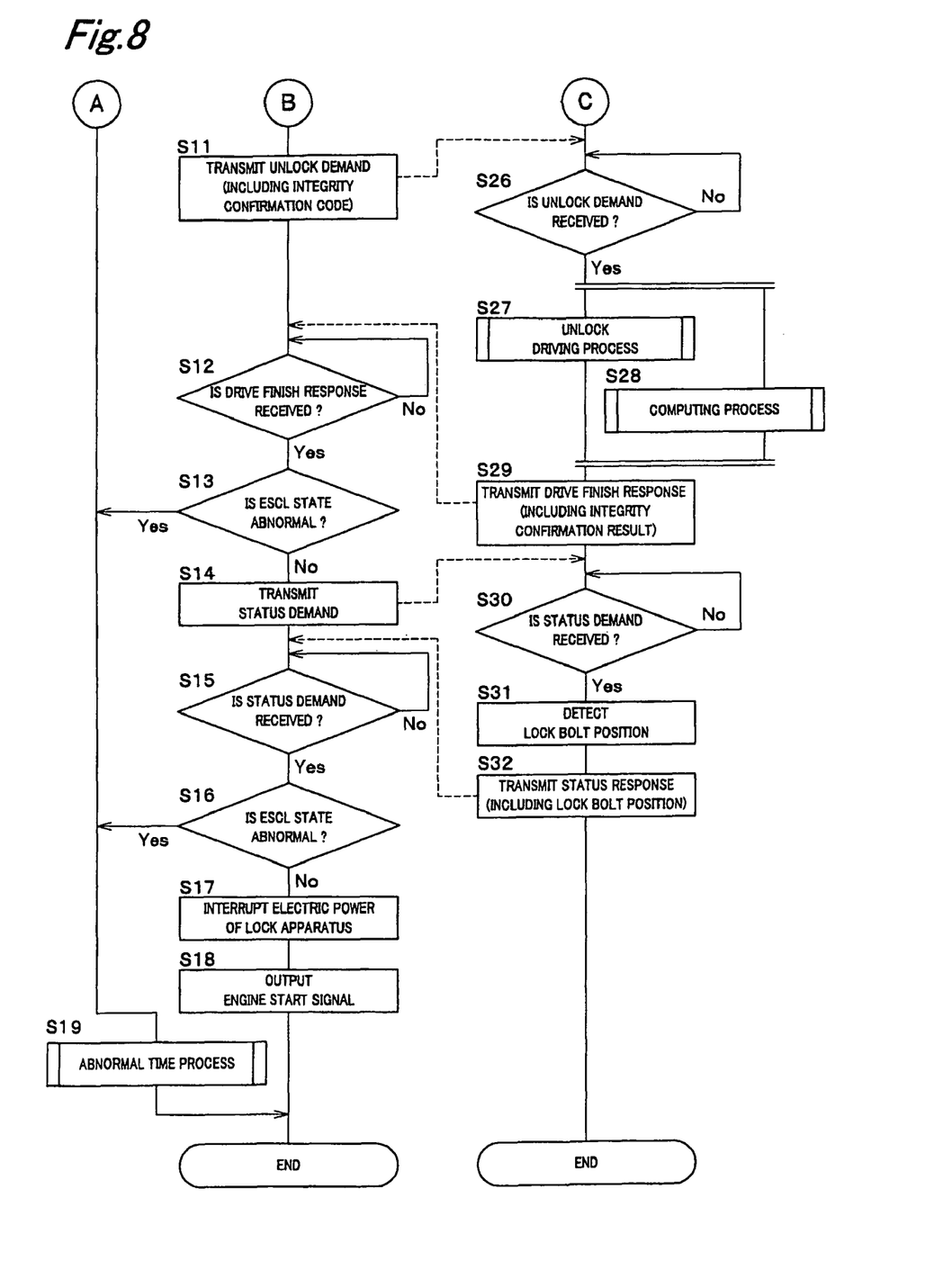
FIG. 8 is a flow chart following to FIG. 7.

Next, the control by the slave microcomputer 38 of the lock apparatus 10 of the present invention including the host microcomputer 1 mounted on the vehicle will be specifically described in accordance with flow charts shown in FIGS. 7 and 8. The flow charts are described in parallel in such a manner as to understand a relation between the host microcomputer 1 and the slave microcomputer 38 which are independently activated. The transmission of the control signal by the communication wire 5 is described by a broken line.

In the unlock process of the vehicle, first of all, the host microcomputer 1 of the vehicle waits until the engine switch 2 is started in step S1. Further, when detecting the starting operation of the engine switch 2, the electric power from the battery is supplied to the lock apparatus 10 via the electric power connecting line 4 in step S2, and thereafter a status demand signal for transmitting a current condition is transmitted to the slave microcomputer 38 in step S3.

On the other hand, the slave microcomputer 38 of the lock apparatus 10 starts from a reset state based on the supply of the electric power, and waits till receiving the status demand signal, in step S20. Further, the slave microcomputer 38 detects the position of the lock bolt 13 via the micro switches 31A to 31C in step S21 by receiving the status demand signal, and transmits the current state information of the lock apparatus 10 including the detected position information as a status response signal in step S22.

Further, if the host microcomputer 1 receives the status response signal in step S4, it analyzing the status response signal in step S5 to detect the position of the lock bolt 13, and determine whether or not there exists an abnormality of the lock apparatus 10 including the slave microcomputer 38 and the micro switches 31A to 31C. Further, if the host microcomputer 1 determines that there exists an abnormality that, for example, the lock bolt 13 exists at the unlock position, it executes an abnormal time process in step S19 shown in FIG. 8. Further, if the host microcomputer 1 determines that no abnormality exists in the lock apparatus 10, and the lock bolt 13 exists at the lock position, it proceeds to step S6, carries out a random number computation by using an ID code of an electronic key received by the sub host microcomputer, and encrypts the result of computation so as to transmit the encrypted result as a challenge demand signal to the lock apparatus 10.

Accordingly, if the slave microcomputer 38 receives the challenge demand signal in step S23, it reads the ID code previously stored in the ROM 43 of the lock apparatus 10, carries out a random number computation of a random number code by using the ID code of the electronic key as a parameter, and compares the received ID code of the electronic key with the stored ID code based on a comparison with the challenge demand signal, in step S24. Further, the slave microcomputer 38 transmits the result of comparison of the ID code as a challenge response signal, in step S25.

Further, the host microcomputer 1 waiting until receiving the challenge response signal in step S7 searches for the electronic key within the vehicle by transmitting a request signal from the sub host microcomputer via an in-vehicle antenna in parallel in step S8. When the host microcomputer 1 receives the code signal including the ID code from the electronic key existing within the vehicle in step S9, it proceeds to step S10. When the electronic key can not be detected, the host microcomputer 1 cancels the engine start control motion, as well as interrupting the feeding to the slave microcomputer 38.

In step S10, the result of comparison is analyzed based on the challenge response signal. Further, in the case of a result indicating that the result of comparison of the ID codes does not coincide, the host microcomputer 1 cancels the engine start control motion as well as interrupting the feeding of the slave microcomputer 38. Further, in the case of a result indicating that the ID codes coincide with each other, the host microcomputer 1 proceeds to step S11 shown in FIG. 8, and transmits the unlock demand signal including the integrity confirmation code to the lock apparatus 10.

Accordingly, as shown in FIG. 8, if the slave microcomputer 38 receives the unlock demand signal in step S26, it processes an unlock driving process in step S27 and a computing process shown in step S28 in parallel.

In the unlock driving process, the lock bolt 13 is moved backward via the rotary gear 20, by forward driving the electric motor 29, as mentioned above. Further, the backward moving condition of the lock bolt 13 is detected based on a transition of the on and off state of the micro switches 31A to 31C, and the electric motor 29 is stopped if it is determined that the lock bolt 13 moves backward to the unlock position.

Further, the computing process includes a command executing the unlock driving process by the function block 42 using the integrity confirmation code received from the host microcomputer 1 as a parameter, as mentioned above, and carries out the computation in correspondence to the command.

Further, if both the unlock driving process in step S27 and the computing process in step S28 are completed, the slave microcomputer 38 transmits the integrity confirmation information corresponding to the result of computation and the position information of the micro switches 31A to 31C detected by the unlock driving process together as a drive finish response signal, in step S29.

Accordingly, if the host microcomputer 1 receives the drive finish response signal in step S12, it detects the position of the lock bolt 13 and determines whether or not there exists an abnormality of the slave microcomputer 38, by analyzing the drive finish response signal, in step S13. Further, if it is not detected that the lock bolt 13 exists at the unlock position, or it is determined that an abnormality exists in the slave microcomputer 38, an abnormal time process in step S19 is executed. Further, if it is detected that the lock bolt 13 exists at the unlock position, and it is determined that an abnormality does not exist in the slave microcomputer 38, the slave microcomputer 38 proceeds to step S14, and retransmits the status demand signal to the slave microcomputer 38 for increasing a reliability.

Further, if the slave microcomputer 38 waiting till receiving the status demand signal receives the status demand signal in step S30, it detects the position of the lock bolt 13 via the micro switches 31A to 31C in step S31, and transmits a status response signal including the detected position information in step S32. Accordingly, the unlock process in the slave microcomputer 38 is finished.

On the other hand, the host microcomputer 1 waiting till receiving the status response signal receives the status response signal in step S15, it detects the position of the lock bolt 13 and determines whether or not there exists the abnormality of the lock apparatus 10 including the slave microcomputer 38 and the micro switches 31A to 31C, by analyzing the status response signal. Further, if the host microcomputer 1 determines that an abnormality exists in the lock apparatus 10, such as it is not detected that the lock bolt 13 exists at the unlock position, the abnormal time process in step S19 is executed. Further, if it is detected that the lock bolt 13 exists at the unlock position, and it is determined that an abnormality does not exist in the lock apparatus 10, the host microcomputer 1 proceeds to step S17.

In step S17, the electric power to the lock apparatus 10 is interrupted from the battery via the electric power connecting line 4, a start signal for starting the engine is outputted to the starter 3 in step S18. Accordingly, the unlock process in the host microcomputer 1 is finished.

Further, in the abnormal time process in step S19, the host microcomputer 1 resets the slave microcomputer 38 once by interrupting the feeding to the lock apparatus 10 via the electric power connecting line 4, first of all. Further, the host microcomputer 1 executes the unlock process again from the electric power supplying step to the lock apparatus 10 in the step 2. When the abnormality is not avoided even by repeating the steps at a previously set frequency, the feeding to the lock apparatus 10 is interrupted, and the engine start control is cancelled. Further, the host microcomputer 1 carries out an informing process for informing the user of the abnormal condition. If the series of steps are finished, the unlock process is finished.

When the host microcomputer 1 detects that the user operates the engine switch 2 for stopping the engine, the lock process is carried out in an approximately similar step to the unlock process. Specifically, this process is different from the unlock process in a point that the lock demand taking the place of the unlock demand including the integrity confirmation code in step S11 is not carried out at this time point, but is carried out after outputting the engine step signal taking the place of the engine start signal in step S18. Further, the feeding to the lock apparatus 10 is stopped after confirming the integrity as well as executing the lock driving process by the slave microcomputer 38. In this case, since the lock process is executed at a time of stopping the engine, the lock process is not conductive to a serious accident. Accordingly, it is not necessary to carry out the confirming process of the integrity.

As mentioned above, in the power steering lock apparatus of the present invention, since the host microcomputer 1 of the vehicle can confirm the integrity of the slave microcomputer 38 of the lock apparatus 10, it is not necessary for the host microcomputer 1 to directly detect the position information of the lock bolt 13 in spite of the fact that only one microcomputer is mounted on the lock apparatus 10 itself. Accordingly, it is possible to reduce the number of the microcomputers mounted on the lock apparatus 10. Further, it is possible to reduce the number of the wirings 4 and 5 wired between the host microcomputer 1 and the lock apparatus 10 thereby to realize the minimum wiring number. Further, since the host microcomputer 1 confirms the integrity of the slave microcomputer 38, and outputs the engine start signal when the lock bolt 13 is positioned in the unlock state, it is possible to securely prevent the serious trouble from being generated.

Further, since the integrity confirmation information includes the command at a time when the slave microcomputer 38 executes the driving process of the lock bolt 13, it is possible to determine whether or not there exists an abnormality in the control obtaining the position information of the lock bolt 13. Further, since the computing process of the integrity confirmation information is carried out by the function block 42 executing the driving process of the lock bolt 13, it is possible to determine whether or not there exists the abnormality of the function block 42. Further, it is possible to securely improve (assure) the integrity of the lock apparatus 10 in cooperation with these structures. Further, the process of the function block 42 is not carried out it is possible to shorten the computing time, the process of the function block 42 being not relevant to the control detecting the position of the lock bolt 13.

In this case, the power steering lock apparatus of the present invention is not limited to the structure of the embodiment mentioned above, but can be modified variously.

For example, in the embodiment mentioned above, the control such as the feeding to the lock apparatus 10 and the like is carried out by the host microcomputer 1 carrying out the engine control, however, the sub host microcomputer may carry out the same control, the sub host microcomputer receiving the ID code of the electronic key possessed by the user via the antenna mounted on the vehicle, and comparing the previously stored certification code. Further, the control may be carried out by one microcomputer by putting together the functions of the sub host microcomputers in the host microcomputer 1.

Further, it goes without saying that a transmitting timing and a transmitting frequency of the request signal, the status signal and the challenge signal are not limited to the structure in accordance with the embodiment, but can be appropriately changed in correspondence to the control system.

What is claimed is:

1. A power steering lock apparatus comprising:
a lock bolt which is movable between a lock position at which the lock bolt is engaged with a steering shaft, and an unlock position at which the engagement is released;
an actuator moving the lock bolt;
an actuator driving part driving the actuator;
a position detecting part detecting an operating position of the lock bolt; and
a slave control part controlling the actuator driving part;
wherein when a host control part which is mounted on a vehicle and outputs an engine start signal by detecting an operation of a switch for starting the engine outputs a control signal to the slave control part, the slave control part executes a control in accordance with the signal, characterized in that:
the host control part outputs an integrity confirmation code signal to the slave control part by detecting the operation of the switch,
the slave control part executes a computing process by using the input integrity confirmation code signal as a parameter, and outputs a computing result together with the lock bolt position information input from the position detecting part as an integrity confirmation information to the host control part,
the host control part determines based on the input integrity confirmation information whether or not the slave control part normally operates, and outputs an engine start signal when the slave control part normally operates and the lock bolt position information by the position detecting part indicates the unlock position state,
wherein the computing process of the integrity confirmation information includes a command for executing a control inputting the lock bolt position information from the position detecting part and transmitting the lock bolt position information to the host control part,
wherein the slave control part executes the computing process of the integrity confirmation information in parallel with the process obtaining the position information of the lock bolt from the position detecting part.

2. A power steering lock apparatus comprising:
a lock bolt which is movable between a lock position at which said lock bolt is engaged with a steering shaft, and an unlock position at which engagement with the steering shaft is released;
an actuator moving said lock bolt;
an actuator driving part driving said actuator;
a host control part which outputs an engine start signal by detecting an operation of a switch for starting the engine;
a slave control part controlling said actuator driving part and communicating with said host control part; and
a position detecting part detecting an operating position of said lock bolt and outputting lock bolt position information to said slave control part,
wherein said host control outputs an integrity confirmation code signal to said slave control part upon detecting operation of the switch,
wherein said slave control part executes a computing process using as a parameter the integrity confirmation code signal output from said host control part, and
wherein said slave control part outputs a computing result together with the lock bolt position information as an integrity confirmation information to said host control part, and
wherein said host control part determines whether or not said slave control part operates normally based on the input integrity confirmation information, and said host control part outputs the engine start signal when said slave control part operates normally and the lock bolt position information indicates the unlock position of said lock bolt.

3. A power steering lock apparatus as claimed in claim 2, wherein the computing process of the integrity confirmation information includes a command for executing a control inputting the lock bolt position information from said position detecting part and transmitting the lock bolt position information to said host control part.

4. A power steering lock apparatus as claimed in claim 2, wherein said slave control part has a plurality of function blocks executing a control inputting the lock bolt position information from said position detecting part and transmitting the lock bolt position information to said host control part, and executes the computing process of the integrity confirmation information by said function blocks.

5. A power steering lock apparatus as claimed in claim 2, wherein said host control part transmits the integrity confirmation code signal together with an unlock demand signal transmitted to said slave control part.

6. A power steering lock apparatus as claimed in claim 2, wherein said slave control part executes the computing process of the integrity confirmation information in parallel with the process obtaining the position information of said lock bolt from said position detecting part.

7. A power steering lock apparatus comprising:
a lock bolt which is movable between a lock position at which said lock bolt is engaged with a steering shaft, and an unlock position at which engagement with the steering shaft is released;
an actuator moving said lock bolt;
an actuator driving part driving said actuator;
a slave control part controlling said actuator driving part, said slave control part being configured to communicate with a host control part which is mounted on a vehicle and outputs an engine start signal by detecting an operation of a switch for starting the engine; and
a position detecting part detecting an operating position of said lock bolt and outputting lock bolt position information to said slave control part,
wherein said slave control part executes a computing process using as a parameter an integrity confirmation code signal output from the host control part upon detecting operation of the switch, and
wherein said slave control part outputs a computing result together with the lock bolt position information as an integrity confirmation information to the host control part so that the host control part can determine whether or not said slave control part operates normally based on the input integrity confirmation information and the host control part can output the engine start signal when said slave control part operates normally and the lock bolt position information indicates the unlock position of said lock bolt.

8. A power steering lock apparatus as claimed in claim 7, wherein the computing process of the integrity confirmation information includes a command for executing a control inputting the lock bolt position information from said position detecting part and transmitting the lock bolt position information to the host control part.

9. A power steering lock apparatus as claimed in claim 8, wherein said slave control part has a plurality of function blocks executing a control inputting the lock bolt position information from said position detecting part and transmitting the lock bolt position information to the host control part, and executes the computing process of the integrity confirmation information by said function blocks.

10. A power steering lock apparatus as claimed in claim 8, wherein the host control part transmits the integrity confirmation code signal together with an unlock demand signal transmitted to said slave control part.

11. A power steering lock apparatus as claimed in claim 8, wherein said slave control part executes the computing process of the integrity confirmation information in parallel with the process obtaining the position information of said lock bolt from said position detecting part.

12. A power steering lock apparatus as claimed in claim 7, wherein said slave control part has a plurality of function blocks executing a control inputting the lock bolt position information from said position detecting part and transmitting the lock bolt position information to the host control part, and executes the computing process of the integrity confirmation information by said function blocks.

13. A power steering lock apparatus as claimed in claim 12, wherein the host control part transmits the integrity confirmation code signal together with an unlock demand signal transmitted to said slave control part.

14. A power steering lock apparatus as claimed in claim 12, wherein said slave control part executes the computing process of the integrity confirmation information in parallel with the process obtaining the position information of said lock bolt from said position detecting part.

15. A power steering lock apparatus as claimed in claim 7, wherein the host control part transmits the integrity confirmation code signal together with an unlock demand signal transmitted to said slave control part.

16. A power steering lock apparatus as claimed in claim 15, wherein said slave control part executes the computing process of the integrity confirmation information in parallel with the process obtaining the position information of said lock bolt from said position detecting part.

17. A power steering lock apparatus as claimed in claim 7, wherein said slave control part executes the computing process of the integrity confirmation information in parallel with the process obtaining the position information of said lock bolt from said position detecting part.

* * * * *